(12) United States Patent
Lee et al.

(10) Patent No.: US 10,503,015 B2
(45) Date of Patent: Dec. 10, 2019

(54) LIGHT-MODULATED QUANTUM DOT COLOR DISPLAY AND METHOD FOR MANUFACTURING THE SAME

(71) Applicant: SEOUL NATIONAL UNIVERSITY R&DB FOUNDATION, Seoul (KR)

(72) Inventors: Sin-Doo Lee, Seoul (KR); Se-Um Kim, Seoul (KR); Jeng-Hun Suh, Gimpo-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/977,628

(22) Filed: May 11, 2018

(65) Prior Publication Data

US 2019/0079354 A1 Mar. 14, 2019

(30) Foreign Application Priority Data

Sep. 11, 2017 (KR) .......................... 10-2017-0115786

(51) Int. Cl.
*G02F 1/1335* (2006.01)
*G02F 1/1337* (2006.01)
(Continued)

(52) U.S. Cl.
CPC ....... *G02F 1/133621* (2013.01); *G02B 26/08* (2013.01); *G02F 1/1337* (2013.01);
(Continued)

(58) Field of Classification Search
CPC ........ G02F 1/13; G02F 1/1333; G02F 1/1335; G02F 1/133514; G02F 1/133528;
(Continued)

(56) References Cited

U.S. PATENT DOCUMENTS 6,864,626 B1 * 3/2005 Weiss ..................... B82Y 20/00
252/299.01
2012/0200219 A1 8/2012 Song
(Continued)

FOREIGN PATENT DOCUMENTS

| JP | 2013-037165 A | 2/2013 |
| KR | 10-1098783 B | 12/2011 |
| KR | 10-2013-0054884 A | 5/2013 |

OTHER PUBLICATIONS

European Patent Office, Extended Search Report and Opinion, European Patent Application No. 18173487.2, dated Oct. 8, 2018, ten pages.

*Primary Examiner* — Thoi V Duong
(74) *Attorney, Agent, or Firm* — Fenwick & West LLP

(57) ABSTRACT

A light-modulated quantum dot (QD) color display according to an embodiment of the present disclosure includes a light source, a light modulator positioned above the light source to control the intensity of light generated from the light source, and a QD light-emitting element positioned above the light modulator and including a plurality of QD patterns having different emission properties in the visible light region by means of light intensity that has passed through the light modulator. According to an embodiment, the QD pattern is configured to accomplish light emission with uniformity and high color purity by uniform distribution of QDs in a matrix using aligned polymer, thereby simultaneously achieving the features of uniform emission of light over the entire pixel, intensity-tunability giving analog grey levels, and high color purity and wide color gamut without using a color filter beyond the limitation of existing QD color display technology.

18 Claims, 20 Drawing Sheets

(51) Int. Cl.
*G02B 26/08* (2006.01)
*B82Y 20/00* (2011.01)
*G02F 1/017* (2006.01)

(52) U.S. Cl.
CPC .. *G02F 1/133514* (2013.01); *G02F 1/133617* (2013.01); *B82Y 20/00* (2013.01); *G02F 2001/01791* (2013.01); *G02F 2001/133738* (2013.01); *G02F 2001/133742* (2013.01); *G02F 2202/022* (2013.01); *G02F 2202/36* (2013.01); *G02F 2203/34* (2013.01)

(58) Field of Classification Search
CPC ......... G02F 1/133602; G02F 1/133621; G02F 1/1336; G02F 1/133609; G02F 1/133617; G02F 1/133611; G02F 1/1337; G02F 2001/133614; G02F 2001/01783; G02F 2001/01791; G02F 2001/133738; G02F 2001/133742; G02F 2202/36; G02F 2202/108; G02F 2202/022; G02F 2203/34; H01L 2251/5369; H01L 27/3211; B82Y 20/00; B82Y 30/00; B82Y 40/00; G02B 26/08; G09G 2300/0452; G09G 2320/0626; G09G 2320/0233; G09G 3/3413; G09G 3/2003
See application file for complete search history.

(56) References Cited

U.S. PATENT DOCUMENTS

| | | |
|---|---|---|
| 2013/0038818 A1 | 2/2013 | Toda et al. |
| 2014/0362556 A1 | 12/2014 | Cho et al. |
| 2015/0002788 A1 | 1/2015 | Guo et al. |
| 2015/0212352 A1 | 7/2015 | Guo et al. |
| 2016/0070136 A1* | 3/2016 | Jang .................. G02F 1/133514 349/61 |
| 2017/0023830 A1 | 1/2017 | Yang et al. |
| 2017/0235191 A1* | 8/2017 | Jang .................. G02F 1/133617 349/64 |
| 2019/0011782 A1* | 1/2019 | Pickett .................. C01B 25/087 |

* cited by examiner

LIGHT-MODULATED QUANTUM DOT COLOR DISPLAY AND METHOD FOR MANUFACTURING THE SAME

CROSS-REFERENCE TO RELATED APPLICATION

This application claims priority to Republic of Korea Patent Application No. 10-2017-0115786, filed on Sep. 11, 2017, and all the benefits accruing therefrom under 35 U.S.C. § 119, the contents of which are incorporated by reference in its entirety.

BACKGROUND

1. Field

The present disclosure relates to a light-modulated quantum dot (QD) color display based on QD patterning technology and a method for manufacturing the same. More particularly, the present disclosure relates to a QD display and a method for manufacturing the same in which uniform QD patterns are formed using the aligning capability of a dispersion matrix, and the intensity of light emitting from the QD patterns is controlled by means of a light modulator.

2. Description of the Related Art

The key concept of quantum dot (QD) color display technology is color representation with high color purity and wide gamut by photo-luminescence or electro-luminescence of QDs. Particularly, photo-luminescence based QD color displays can be applied to existing flat panel display technology.

However, in current commercial QD liquid crystal displays utilizing either a QD film, having two or more QDs emitting different colors, in a backlight unit, or the QDs in the backplane, it is essential to use a color filter in the separation of the mixed color into three primary colors (red, green, and blue), thereby transmittance loss is inevitably involved and the color purity is limited by the color filter.

To overcome the limitations of existing QD displays, attempts to directly use the QD emission with different spectra (wavelengths) have been made so far. The QD emits only a characteristic wavelength of light and accordingly a QD color pixel can reduce transmittance loss and produce high color purity. Ultimately, this yields colors without a color filter so that high transmittance and high color purity can be achieved. However, QD pattern for photo-luminescence needs to be a few micrometers high to achieve sufficient emission intensity. Additionally, to represent three primary colors, it is necessary to form three different patterns of QDs on a substrate, requiring a difficult patterning technology and a high process cost.

Recently, to solve this problem, the matrix QD patterning technology was developed to disperse QDs in a polymer matrix. The matrix QD pattern is easy to adjust the physical size of the pattern and the QD emission intensity can be tailored by the concentration of QDs in the matrix. In addition, the polymer matrix allows patterning of QDs using conventional photo-lithography and thus two or more types of different matrix QD patterns can be easily fabricated.

However, the uniform dispersion of QDs in the polymer matrix, for example, photoresist and color filter resin, and the reliability of QD patterns have not been demonstrated so far. Due to non-uniform distribution of QDs in the matrix, the existing matrix QD patterns still require a color filter for real display applications, in the same way as a QD film. Accordingly, to realize a QD color display using the matrix QD pattern without a color filter, there is a need for a new dispersion and patterning technology of QDs to achieve high color purity and wide color gamut beyond the existing technology.

SUMMARY

Embodiments of the present disclosure are directed to providing a light-modulated quantum dot (QD) color display of a new concept in which matrix QD patterns emitting different colors are fabricated through uniform dispersion of QDs in aligned polymer matrix, minimizing the aggregation of QDs, and a light modulator is utilized to control the emission intensity of QDs and a method for manufacturing the same. The light-modulated QD color display achieves the uniform emission of light over entire pixel, analog grey levels, high color purity and wide color gamut from the matrix QD patterns without a conventional color filter used in existing technology.

A light-modulated QD color display according to an embodiment includes a light source, a light modulator positioned above the light source to modulate transmittance of light through the modulator from the light source, and a QD light emitting element positioned above the light modulator to generate the QD light emission by the transmitted light.

In an embodiment, the QD light emitting element may include plurality of QD patterns having different emission properties.

In an embodiment, at least two of the plurality of QD patterns in the aligned polymer matrix may have different values of the thickness for the QD patterns or different sizes and different materials of QDs therein.

In an embodiment, the QD light emitting element may further include a substrate, and an alignment layer interposed between the substrate and the plurality of QD patterns, and the QD patterns may be configured to accomplish uniform light emission by uniform distribution of QDs in an aligned matrix or a medium using the aligned polymer.

In an embodiment, an alignment direction of the aligned polymer in the matrix may be set to a direction that is vertical or horizontal to the plane of the substrate.

In an embodiment, the aligned polymer matrix may be made of reactive mesogens or photo alignment materials.

In an embodiment, the QD pattern may have a cross section of a closed shape in geometry, forming a polygon or a curve and a straight line when viewed along a direction perpendicular to the plane of the substrate.

In an embodiment, the light source may have wavelengths that induce QDs to emit light.

In an embodiment, the light modulator may control transmittance of light for each pixel through the modulator from the light source.

In an embodiment, the light modulator may be made of a liquid crystal.

A method for manufacturing a light-modulated QD color display according to an embodiment includes forming an alignment layer on the outer surface or the inner surface of a substrate, forming a plurality of QD patterns with different emission properties on the alignment layer, placing the substrate with QD patterns above a light modulator, placing the light modulator above a light source.

In an embodiment, the light emission of the QD pattern may be electro-luminescence upon the application of an external voltage, or photo-luminescence upon the transfer of the light energy from a light source.

According to an embodiment of the present disclosure, there is provided a light-modulated QD color display including a light source that allows QD to emit light upon the light modulation, a light modulator positioned above the light source to control transmittance, and a QD light emitting element capable of photo-luminescence at a specific wavelength range in the visible light.

According to another embodiment of the present disclosure, there is provided a method for manufacturing alight-modulated QD color display.

According to still another embodiment of the present disclosure, there is provided a QD light emitting element in which QDs are uniformly dispersed in an aligned matrix or a medium using aligned polymer to achieve uniform light emission.

According to embodiments, uniform distribution of QDs in aligned matrix achieves high purity color without a color filter beyond the limitations of existing color display technology.

Additionally, as dissimilar to organic light-emitting diode technology requiring complex processes such as electron or hole injection, transport, recombination and light emission, it is possible to directly emit light from QDs by the photo-excitation, providing economic efficiency and a commercially superior effect in that it can be easily applied and manufactured by existing liquid crystal display (LCD) manufacturers.

DETAILED DESCRIPTION

Figure 1:
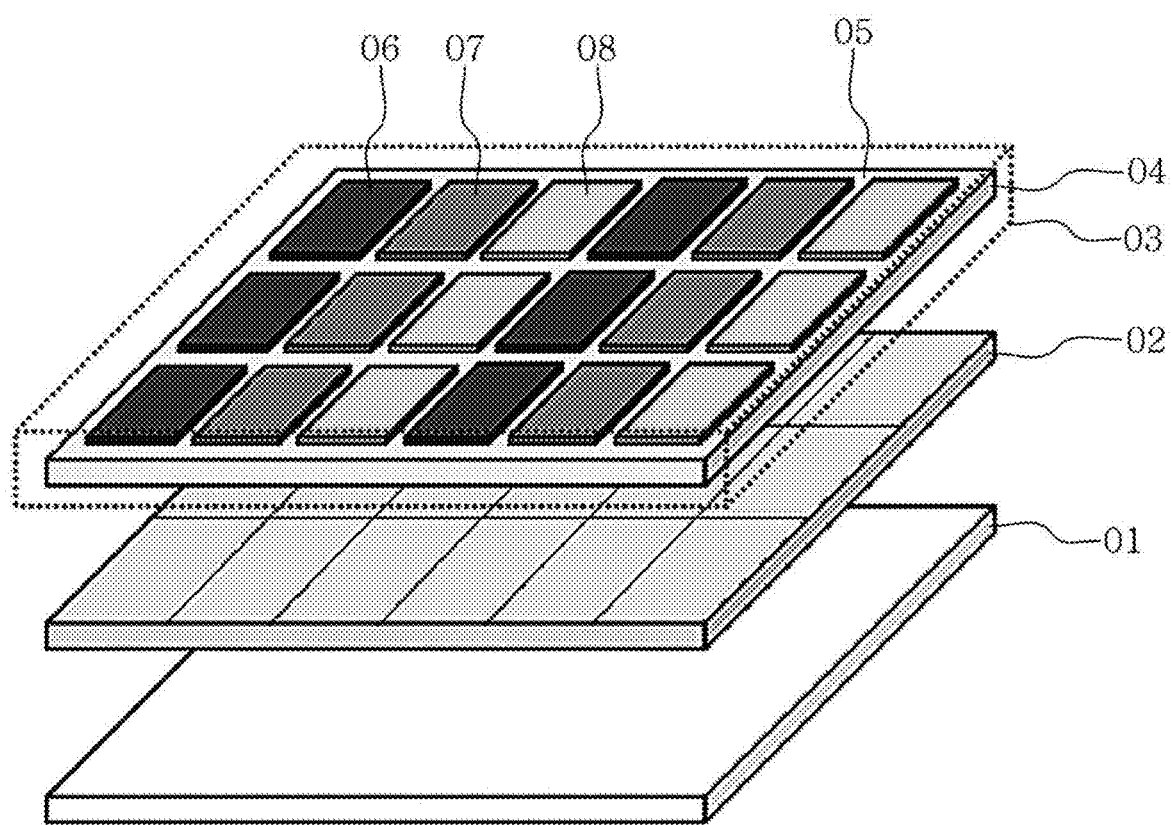
FIG. 1 is a schematic view of a light-modulated quantum dot (QD) color display according to an embodiment.

The present disclosure is described in detail as below with reference to the accompanying drawings in which particular embodiments for carrying out the present disclosure are shown for illustration. These embodiments are described in sufficient detail to enable those skilled in the art to practice the present disclosure. Various embodiments of the present disclosure are different from each other, but they do not need to be exclusive. For example, a particular shape, structure and characteristic described herein, in connection with one embodiment, may be implemented in other embodiments without departing from the spirit and scope of the present disclosure.

Further, it should be understood that modification may be made to the position or arrangement of respective elements in each disclosed embodiment without departing from the spirit and scope of the present disclosure. Therefore, the following detailed description is not made in a restrictive sense, and the scope of the present disclosure is only defined by the appended claims, if appropriately described, along with the full scope of equivalents to which the claims are entitled. In the drawings, similar reference numerals denote same or similar functions throughout many aspects.

Hereinafter, the embodiments of the present disclosure will be described in more detail with reference to the accompanying drawings.

FIG. 1 is a view of a light-modulated quantum dot (QD) color display according to an embodiment.

Referring to FIG. 1, the light-modulated QD color display according to an embodiment of the present disclosure includes a light source 01, a light modulator 02 and a QD light emitting element 03.

According to an embodiment, the light-modulated QD color display may further include a substrate 04 in the QD light-emitting element, and includes an alignment layer 05 formed on the substrate and a plurality of aligned matrix QD patterns positioned on the alignment layer.

Hereinafter, the function of the elements will be described in detail.

The light source 01 is a part for generating photo-luminescence of QD, and may include an element that emits a proper light for inducing photo-luminescence of QD such as blue light to ultraviolet light.

The light modulator 02 positioned above the light source 01 is composed of a plurality of pixels to continuously modulate the transmittance of light through the modulator from the light source by means of an external voltage. In an embodiment, the light modulator 02 may control the transmittance of light for each pixel from the light source.

In an embodiment, the light modulator 02 may be a liquid crystal-based light modulator. However, this is for illustration only and the material and tuning mechanism of the light modulator is not limited to the foregoing statements. That is, any device that can modulate the intensity of light traveling from the light source to the QD light emitting element will suffice.

The substrate 04 in the QD light emitting element 03 positioned above the light modulator 02 is a part that supports the entire structure of the QD light emitting element 03, and may be made of glass, quartz, polymer resin (for example, plastics, etc.), or any other appropriate material.

The multiple aligned matrix QD patterns arranged on the substrate 04 have different light-emitting properties in the visible light range. For example, QDs (for example, 06, 07, and 08) in the plurality of aligned matrix QD patterns may each emit light depending on the material and the size of QD in red (R), green (G) and blue (B) wavelengths.

To have different emission properties as above, the plurality of aligned matrix QD patterns may have QDs in different sizes and materials (for example, 06, 07, and 08). In an embodiment, the QD materials may include materials such as cadmium-selenide and cadmium-sulfide to obtain the light-emitting properties in the visible light range that can achieve high color purity and efficiency. However, this is for illustration only, and such material include any QD capable of generating light emission by the photo-excitation from the light source and is not limited to a particular material.

Furthermore, the light-modulated QD color display according to an embodiment further includes the alignment layer 05 formed on the substrate 04. The alignment layer 05 is used for defining a direction of the polymer orientation in the aligned matrix QD pattern.

The alignment layer 05 may define the alignment direction of the aligned polymer by photo alignment, rubbing, or any other appropriate method. Although in an embodiment, the alignment layer 05 may be made of a material which is easy to form a thin film and of which an alignment direction can be defined through an additional process, for example, polyimide or silicon oxide ($SiO_2$), this is for illustration only, and the material that forms the alignment layer and the forming process is not limited to the foregoing statements.

Although the light-modulated QD color display according to the embodiments described herein is formed such that unit pixels each emitting light at the characteristic wavelengths corresponding to red (R), green (G) and blue (B) are periodically arranged, in other embodiments, the components and sizes of QDs and the emission wavelength range of each QD, the arrangement order and/or the arrangement type may be different from those disclosed herein. For example, the light-modulated QD color display may be composed of cyan, yellow, and magenta unit pixels and the structure of the elements may be appropriately changed so that it is suited to an intended field of application.

Hereinafter, the aligned matrix QD pattern that is an element of the light-modulated QD color display according to an embodiment will be described with reference to FIGS. 2A to 2C.

Figure 2A:
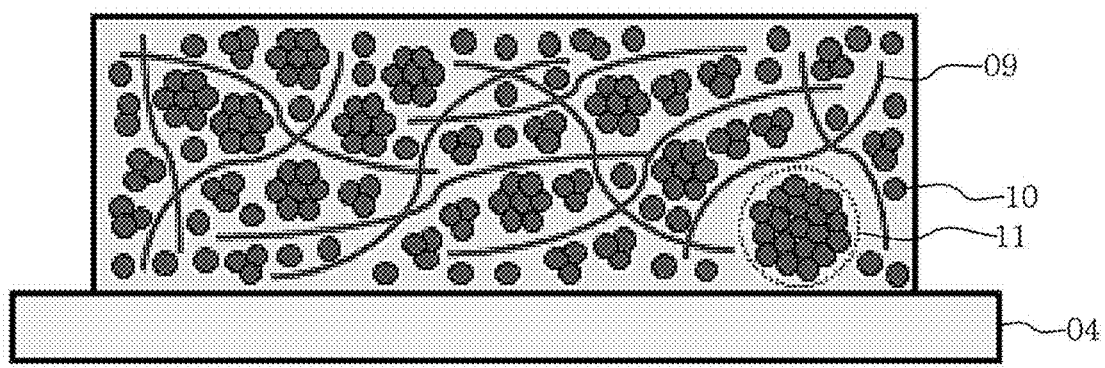
FIGS. 2A to 2C are schematic diagrams showing the underlying mechanism for uniform dispersion of QDs in the matrix QD patterns with no alignment, vertical alignment, and horizontal alignment, respectively, according to an embodiment.

FIG. 2A illustrates the conventional QD pattern in the unaligned polymer matrix. As shown, the distribution of QDs 10 dispersed in the unaligned polymer matrix 09 is composed of agglomerated QDs 11 in different sizes, resulting in non-uniform dispersion.

Figure 2B:
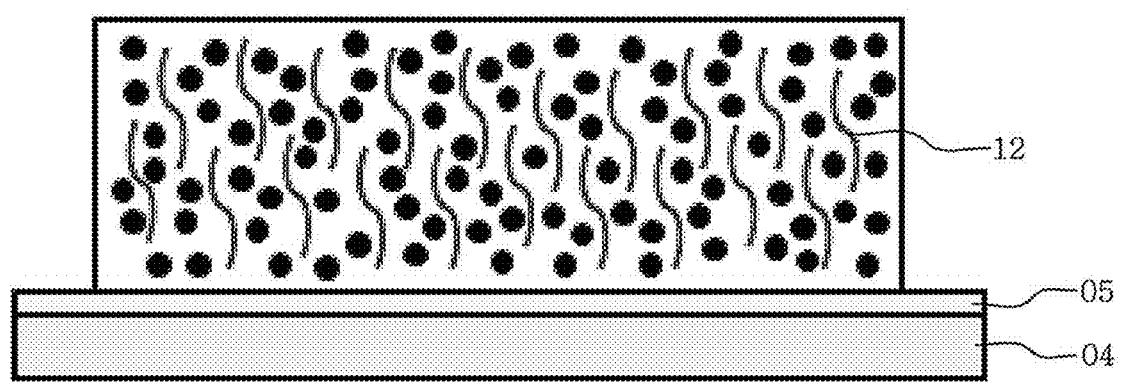
Figure 2C:
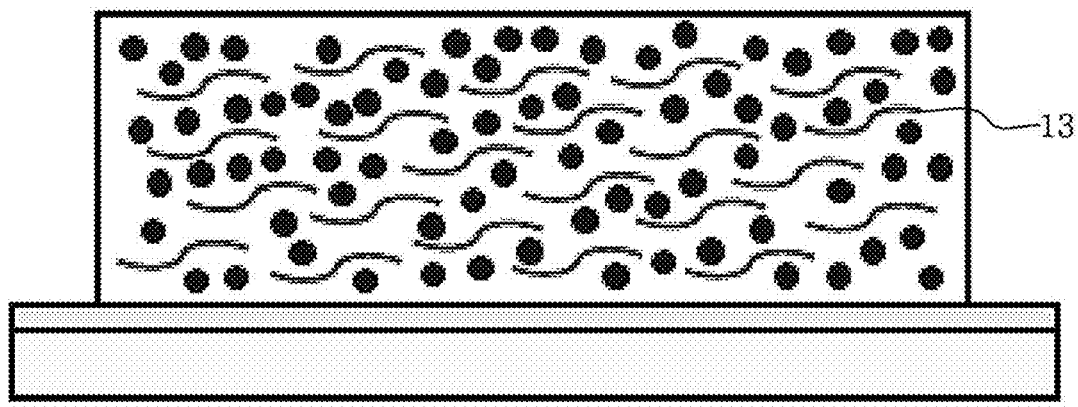

To solve this, as shown in FIGS. 2B and 2C, aligned matrices 12, 13 may be formed by fabricating the alignment layer 05 on the substrate 04. On the alignment layer 05, the constituent molecules tend to be aligned and the intermolecular distance becomes shorter, thereby preventing the agglomeration of QDs in the aligned matrix. The alignment direction of the molecules in the aligned matrix may be defined to be vertical as in FIG. 2B or horizontal as in FIG. 2C depending on the nature of the alignment layer.

In an embodiment, the aligned matrices 12, 13 may be made of reactive mesogen to ensure the aligning capability, high transmittance, and ease of solidification process. However, this is for illustration only, and the aligned matrices 12, 13 may be made of any material that can possess the orientational order (or directional order) on the alignment layer or spontaneous orientational order and are not limited to a particular material.

Figure 3A:
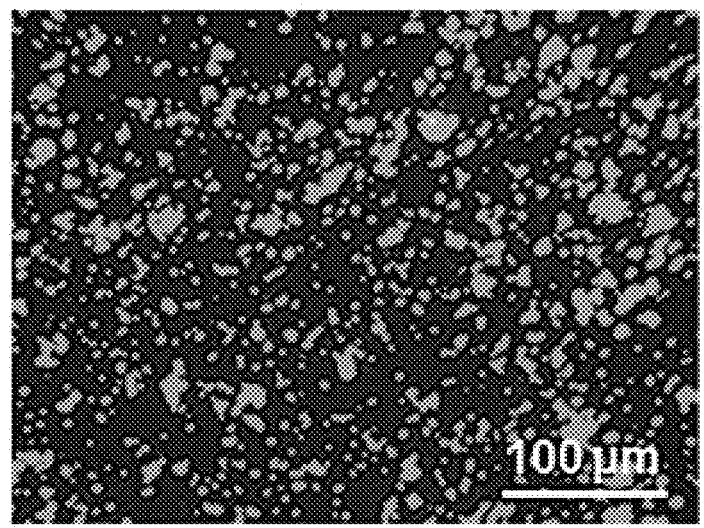
FIGS. 3A to 3C are photographic images showing real emission properties of QD patterns fabricated using three types of the matrices of unaligned polymer, vertically oriented polymer, and horizontally oriented polymer, respectively, according to embodiment.
Figure 3B:
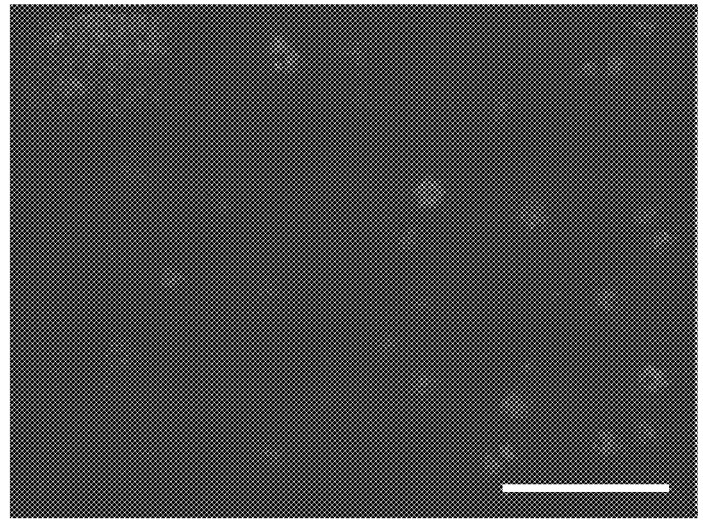
Figure 3C:
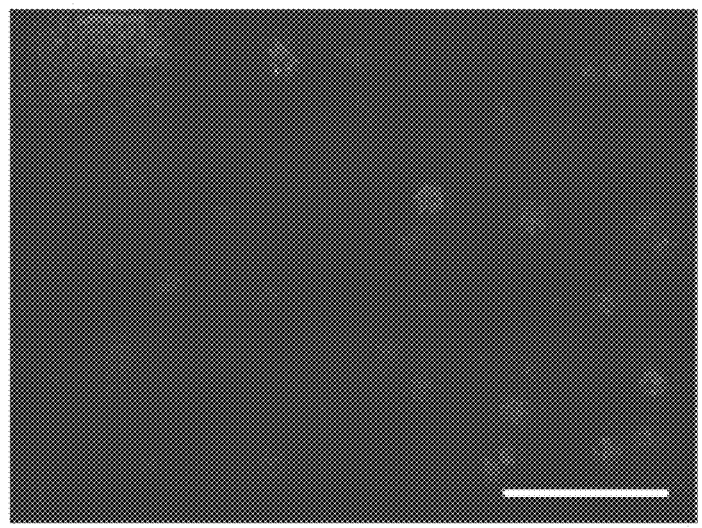

FIGS. 3A to 3C are photographic images showing light emission properties of three matrix QD patterns (06, 07, and 08 in FIG. 1) fabricated using unaligned polymer, vertically aligned polymer, and horizontally aligned polymer. In an embodiment, after an alignment layer is formed on a glass substrate (04 in FIG. 1) through a solution process. The horizontal alignment of polymer chains is produced on the horizontal alignment layer in which the alignment direction is defined using a rubbing method. The vertical alignment is spontaneously produced on the vertical alignment layer without rubbing. The aligned matrices of vertically aligned polymers and the horizontally aligned polymers are made of reactive mesogens. For QDs, cadmium-selenide QDs capable of emitting light in red wavelength range are used. To allow QD to emit light, light in the ultraviolet region (365 nm) is used for photo-excitation. These process conditions are only experimental examples, and do not represent the optimum condition or do not limit the scope of the present disclosure.

Referring to FIG. 3A, the conventional matrix QD pattern using unaligned polymer shows non-uniform emission properties. As described previously, this is because QDs are agglomerated in different sizes are distributed non-uniformly in the polymer matrix due to no alignment of the polymer chains.

In contrast, as shown in FIGS. 3B and 3C, it can be seen from the microscopic image that the aligned matrix QD pattern using vertically or horizontally aligned polymer according to an embodiment of the present disclosure emits uniform light over the entire region.

Although the foregoing description is made based on light emission by photo-excitation (or photo-luminescence) from the light source, the technical spirit of the present disclosure is not limited thereto and may be applied to electro-luminescence of QD in which light is emitted upon the application of an applied voltage. That is, although the embodiment herein describes photo-luminescence technology, the underlying mechanism for uniform dispersion of QD in the aligned medium is not limited to the case of photo-luminescence of QD. For example, when conducting or semiconducting polymer with alignment is used for the dispersion matrix of electro-luminescence QD, the uniform dispersion for QD may be achieved. In this instance, any device requiring charge transport in relation to uniform distribution of QD for light emission through current flow will suffice.

In an embodiment, there is provided a QD light-emitting element that can be used both in the field of photo-luminescence and electro-luminescence technology. The QD light-emitting element includes a plurality of QD patterns having different emission properties, wherein the QD patterns are designed to achieve uniform light emission by uniform distribution of QDs in a matrix using aligned material including polymer.

Hereinafter, a process of fabricating the aligned matrix QD pattern in the light-modulated QD color display according to an embodiment will be described with reference to FIGS. 4A and 4D.

Figure 4A:
FIGS. 4A to 4D are the schematic diagrams showing the processes of fabricating aligned matrix QD patterns of red (R), green (G), blue (B) colors, respectively, in series for a QD color display according to an embodiment.

Referring to FIG. 4A, a step for forming an alignment layer 05 on a substrate 04 is performed. For example, an alignment layer 05 may be formed on a substrate 04 made of glass or plastic using a solution process or vacuum deposition. The alignment layer 05 may define an alignment direction of constituent molecules of a dispersion matrix of QD by photo alignment, rubbing, or any other appropriate method. The alignment layer 05 may be made of a material that is easy to form a thin film and can define the molecular alignment direction through an additional process, such as polyimide and silicon oxide ($SiO_2$).

According to an embodiment, the process of forming the alignment layer 05 may include a process such as the photo-exposure of ultraviolet light on a photo alignment layer to define the alignment direction of the dispersion matrix. However, this is for illustration only, and the material that forms the alignment layer and the forming process is not limited to the foregoing statements.

Figure 4B:
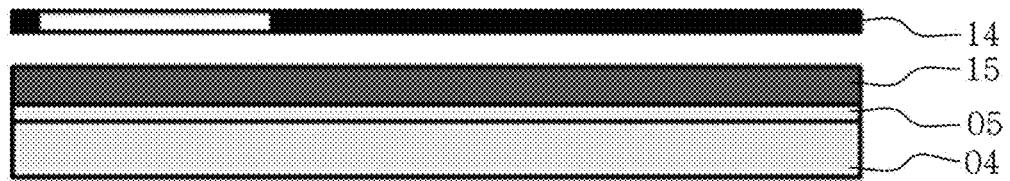
Figure 4C:
Figure 4D:
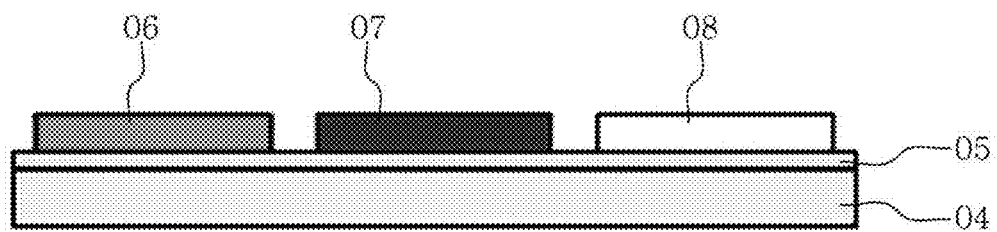

Referring to FIGS. 4B to 4D, a step for forming a plurality of aligned matrix QD patterns on the alignment layer 05 formed in the process of FIG. 4A is performed. The plurality of aligned matrix QD patterns is for emitting light only in a specific wavelength range. For example, each of the plurality of aligned matrix QD patterns emits light only in the wavelength range corresponding to red (R), green (G) and blue (B) wavelengths.

As shown in FIG. 4B, a QD-dispersion matrix mixture 15 is formed on the alignment layer 05 and partially exposed to ultraviolet light through a mask 14 for photolithography to form a QD pattern 06 as shown in FIG. 4C, and by repeating this process, aligned matrix QD patterns 06 to 08 may be formed as shown in FIG. 4D.

In the above process, the plurality of aligned matrix QD patterns may be formed by applying a solution of QD-dispersion mixture onto the alignment layer through a solution process, performing photolithography, and solidifying through a photo-curing process, but is not limited thereto. According to an embodiment, to acquire different light-emitting properties, the emission spectra of the aligned matrix QD patterns may be tailored by the material properties and the physical size of the QD being mixed.

In the process of manufacturing a light-modulated QD color display according to the embodiment described above, the plurality of aligned matrix QD patterns corresponding to R, G, B unit pixels are all formed with a similar structure. Accordingly, QD patterns may be formed by iteratively performing the process corresponding to FIGS. 4B and 4C.

Figure 5A:
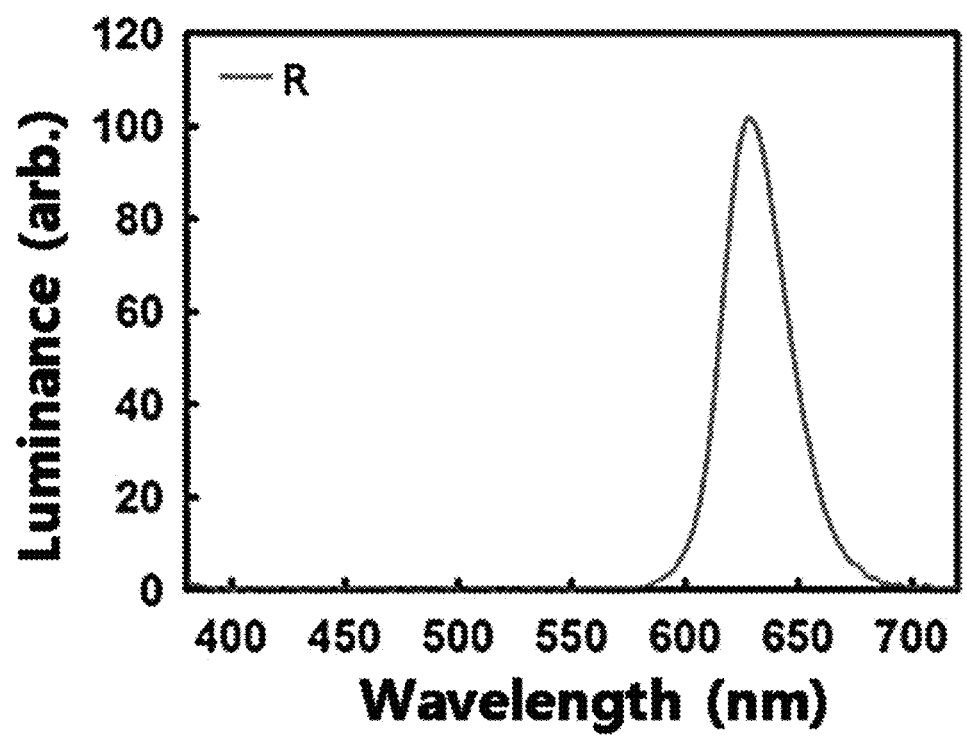
FIGS. 5A to 5C are graphs showing the emission intensities at the characteristic wavelengths of aligned matrix QD patterns fabricated to emit light in the wavelength range corresponding to red (R), green (G), and blue (B) colors, respectively, according to embodiment.
Figure 5B:
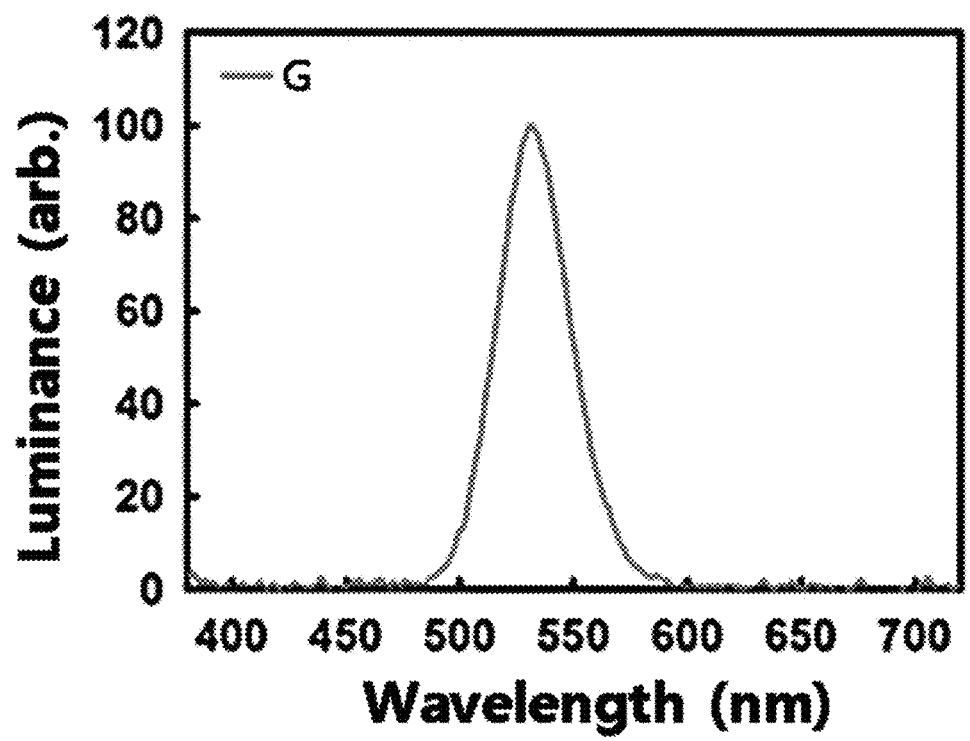
Figure 5C:
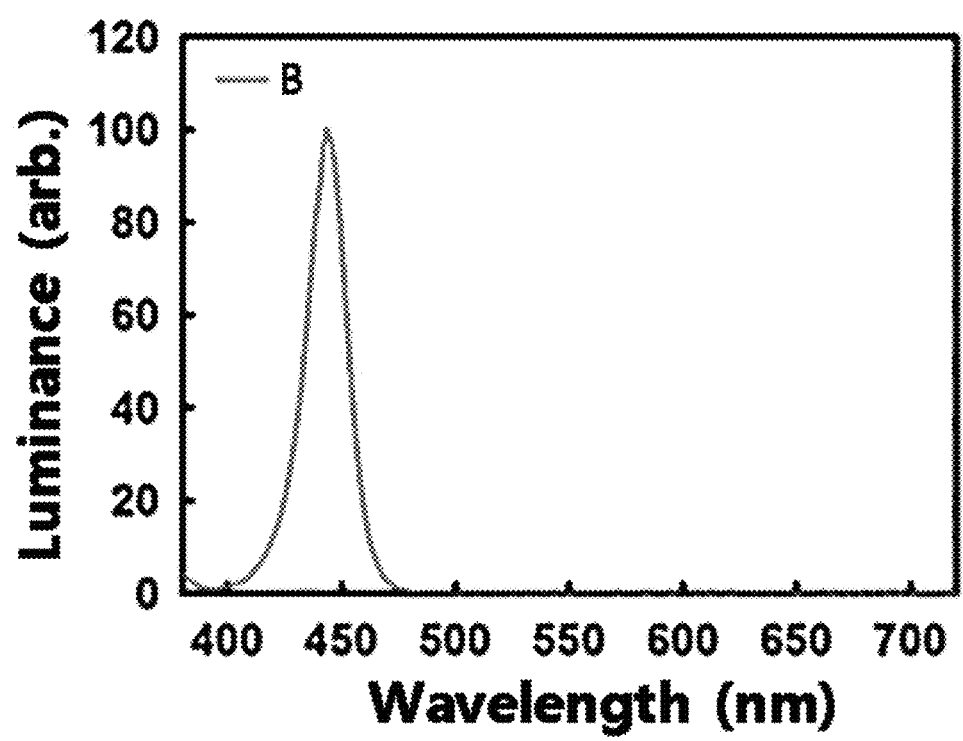

FIGS. 5A to 5C show emission intensity curves at the characteristic wavelengths of the aligned matrix QD patterns, corresponding to R, G, and B wavelengths. In an embodiment, for the vertical alignment of the polymer chains in the matrix, the vertical alignment layer is formed on a glass substrate through a solution process, and no additional process is needed. The vertically aligned matrix is made of reactive mesogens, and QDs are cadmium-selenide QDs capable of emitting light of R, G, B wavelengths depending on the materials and the size. To allow the QDs to emit light, QDs are photo-exposed to light in the ultraviolet region (365 nm). The emission intensities at the characteristic wavelengths of the aligned matrix QD patterns are measured using a commercial UV-Vis. Fiber optic spectrometer (Ocean Optics S2000) in ambient environment. The above conditions are only experimental examples, and do not represent the optimum condition or limit the scope of the present disclosure.

Referring to FIGS. 5A to 5C, three aligned matrix QD patterns emit light whose central wavelengths are about 620 nm (FIG. 5A), 530 nm (FIG. 5B), and 440 nm (FIG. 5C) that belong to typical R, G, B wavelengths. As shown in FIGS. 5A to 5C, QDs of the aligned matrix QD patterns emit light in a specific wavelength range when photo-excited by a light source. However, the emission wavelength range of QD is not limited to the foregoing statements, and the emission wavelength range of QD may be appropriately adjusted using the material and/or the size of QD.

Figure 6A:
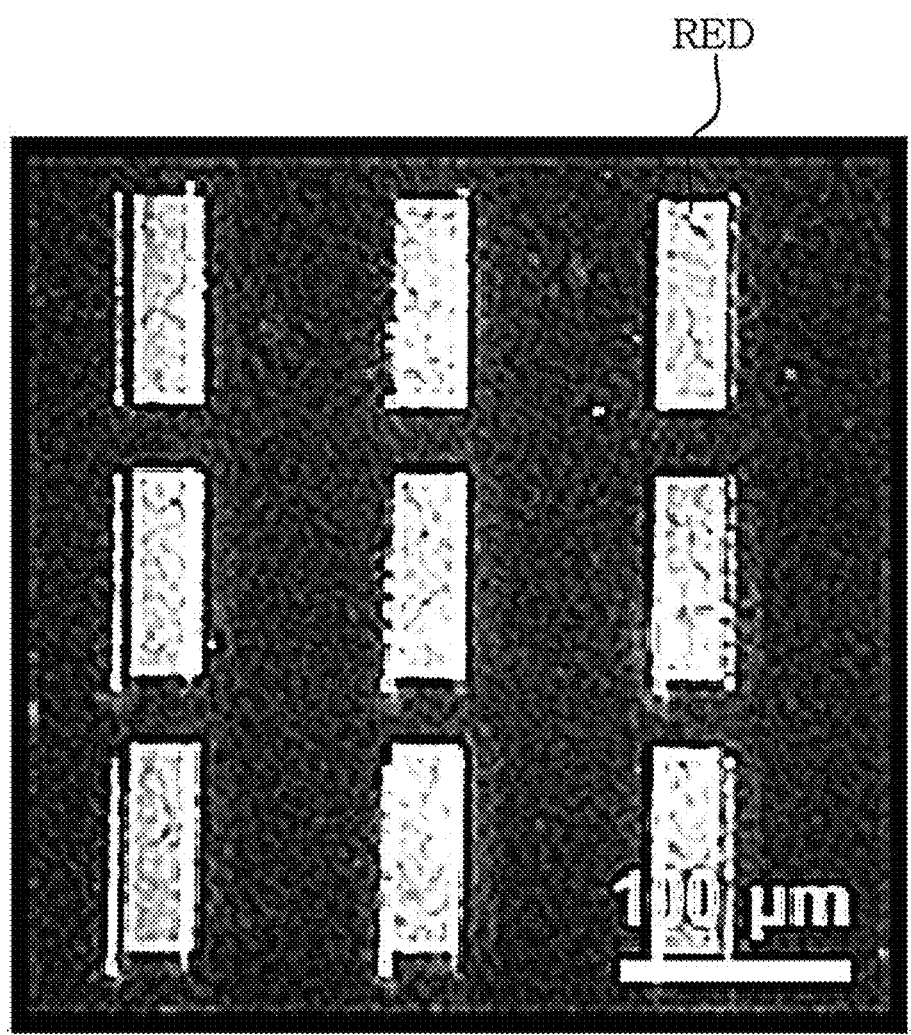
FIGS. 6A to 6C are photographs s showing the emission properties of red (R) and green (G) QD patterns in the aligned matrix fabricated oni a single substrate according to embodiment.
Figure 6B:
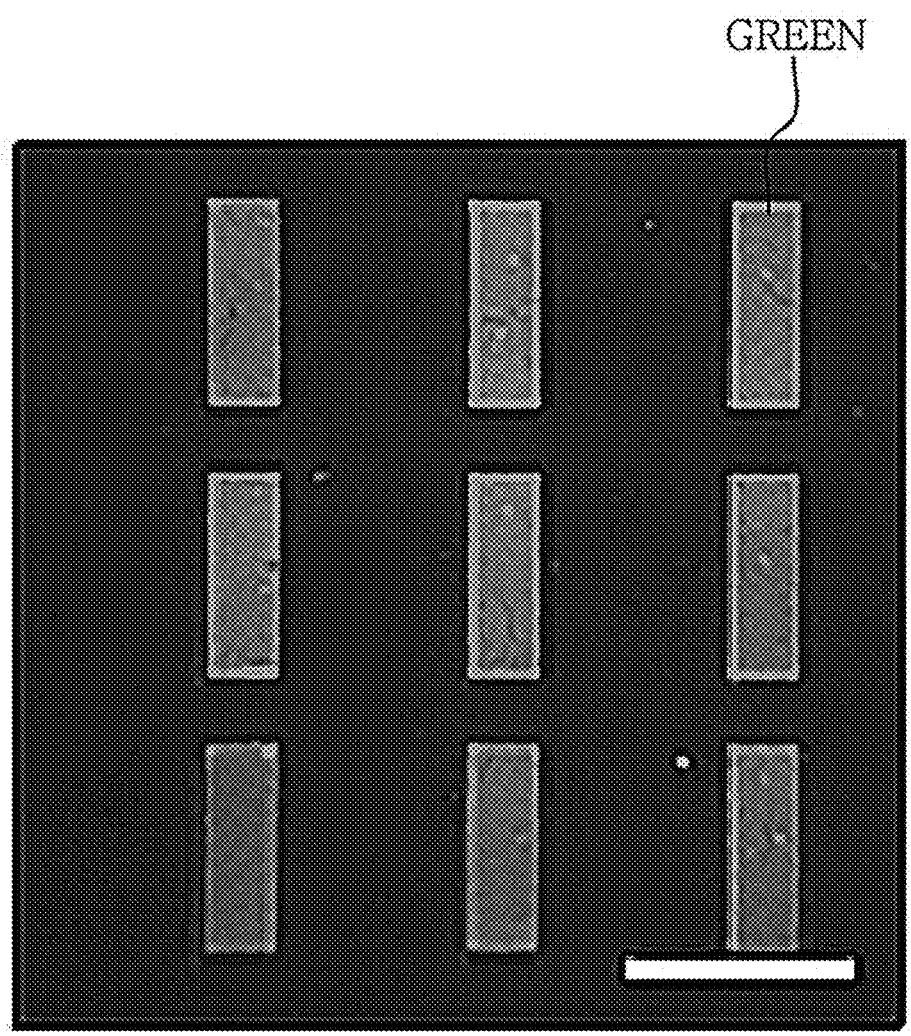
Figure 6C:
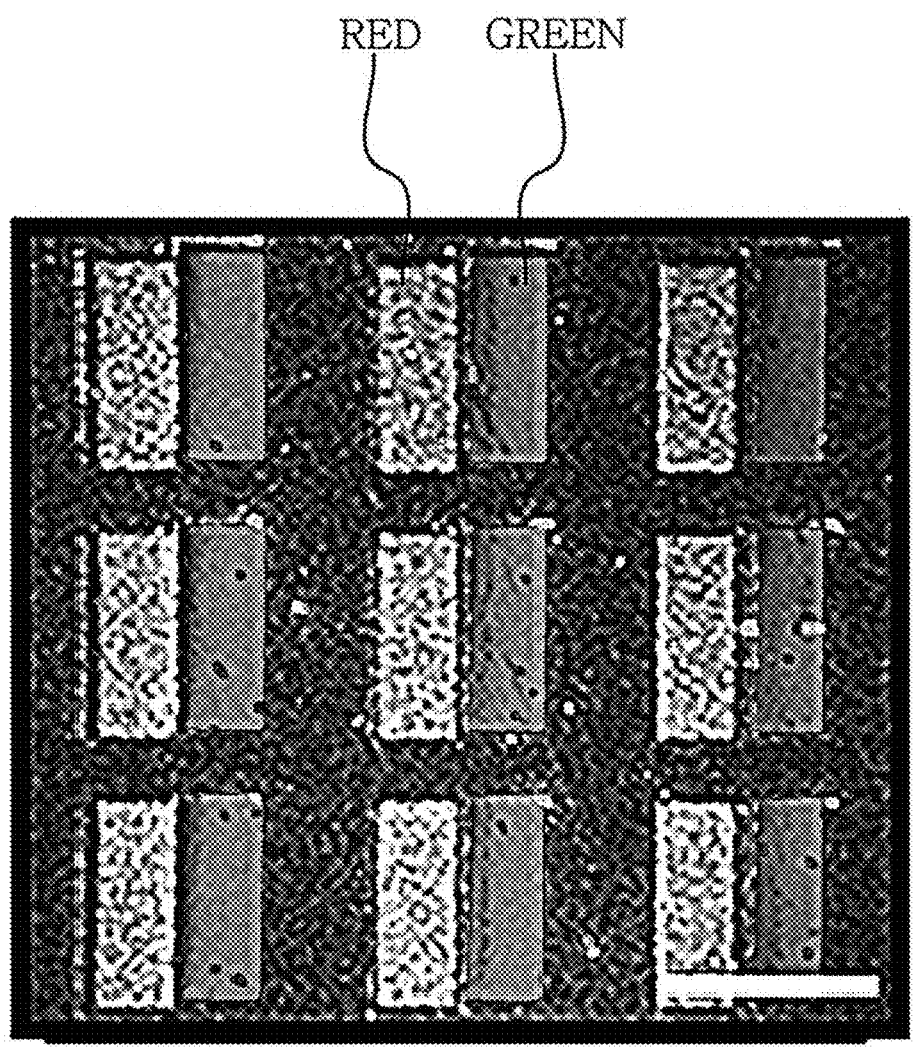

FIGS. 6A and 6B are photographic images of two types of aligned matrix QD patterns, showing that the plurality of aligned matrix QD patterns fabricated to emit light at red (R) and green (G) wavelengths are implemented in a single substrate. To allow QDs to emit light, light in the ultraviolet region (365 nm) is used for photo-excitation. FIGS. 6A and 6B are photographic images of red (R) patterns only and green (G) patterns only, respectively. Light emitting properties from red (R), green (G) pixels by the photo-excitation from the light source are shown. On the other hand, FIG. 6C is a photographic image showing both red (R) and green (G) patterns are formed, and shows the light-emitting properties of red and green patterns.

Figure 7A:
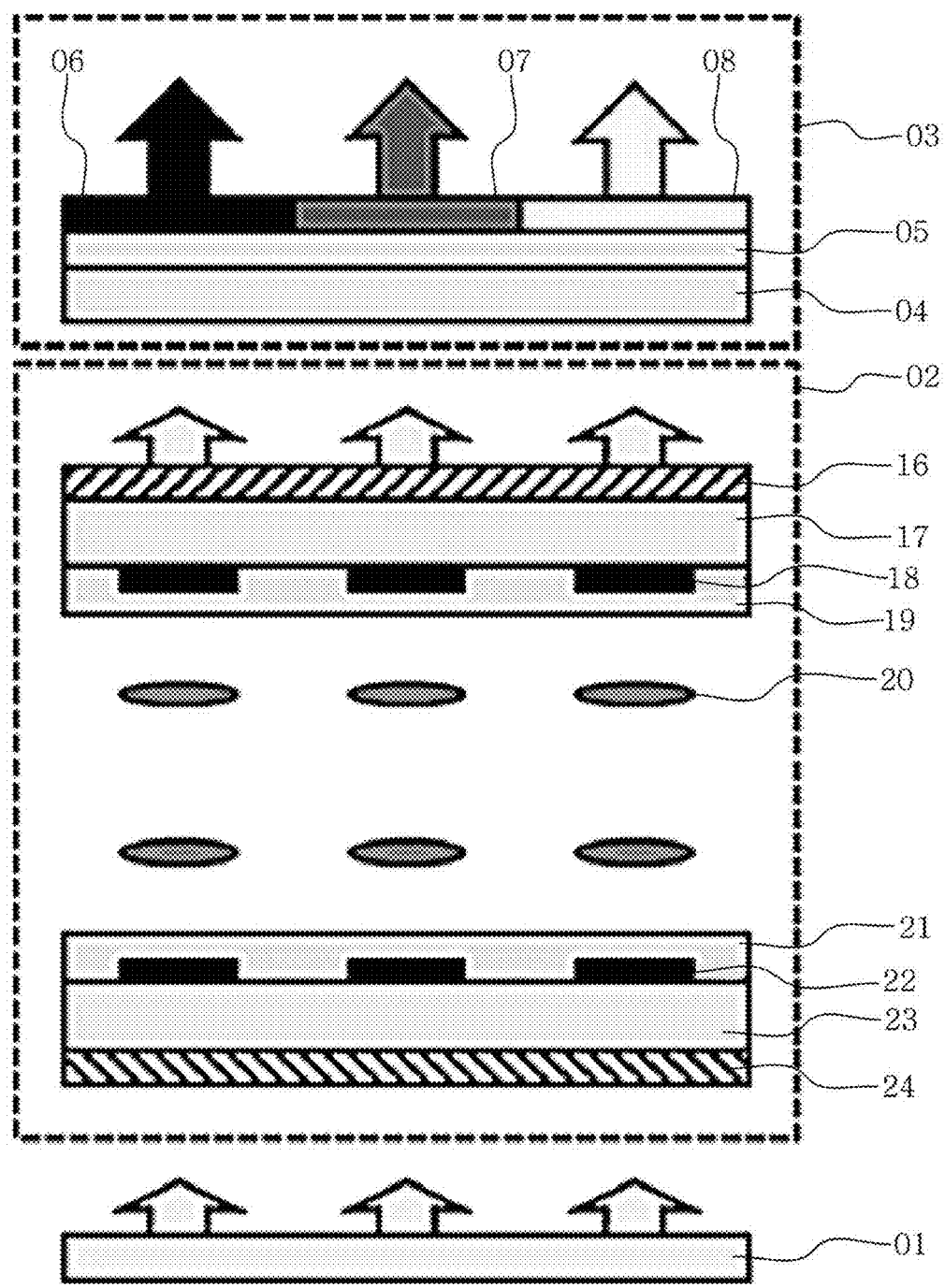
FIGS. 7A and 7B are conceptual views showing the bright state and the dark state in the operation of a light-modulated QD color display, respectively, according to an embodiment.
Figure 7B:
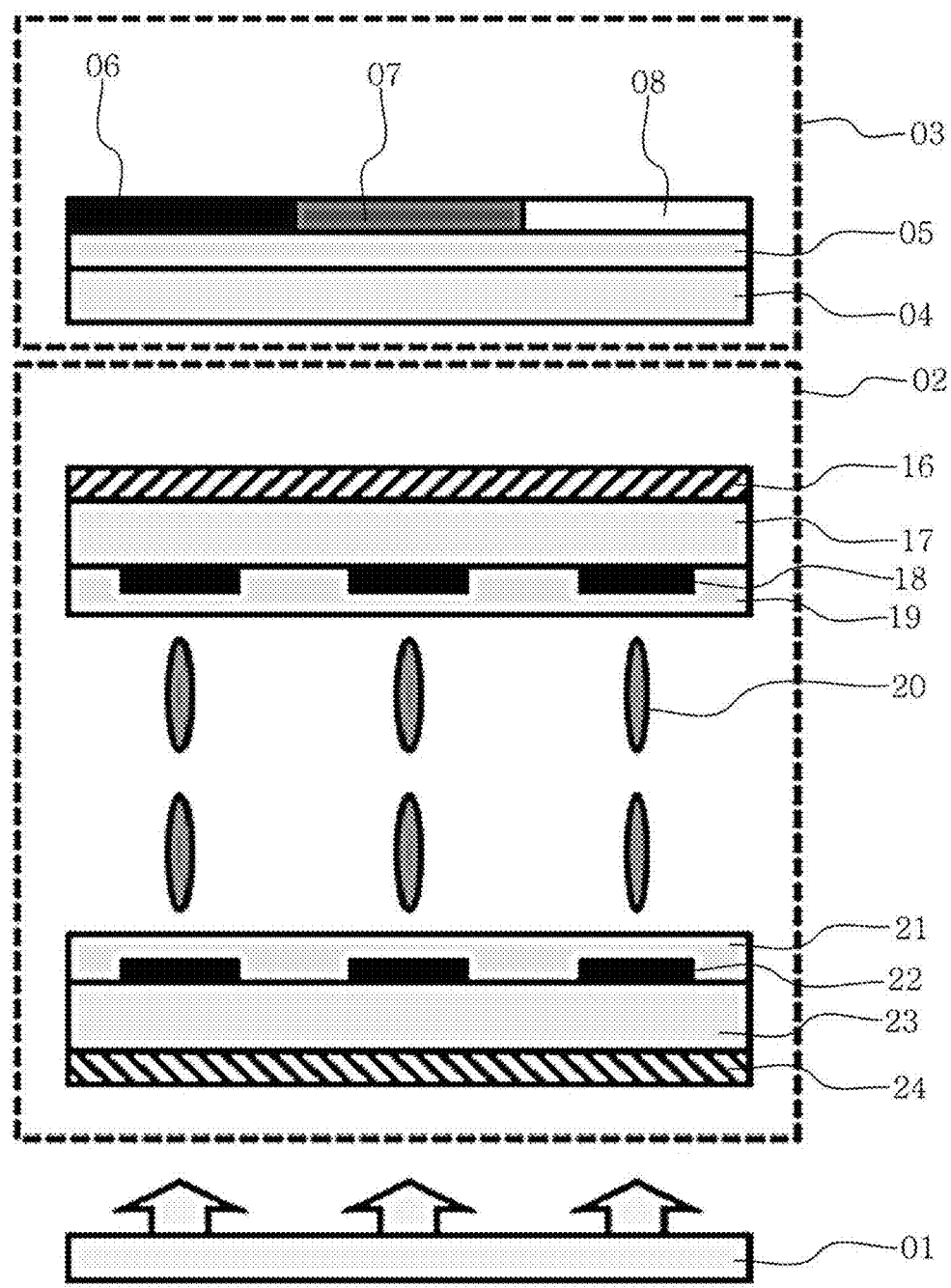

FIGS. 7A and 7B are conceptual views showing the bright state and the dark state in the operation of the light-modulated QD color display, respectively, according to an embodiment. The light modulator 02 used in the embodiment may include the upper polarization plate 16, the upper substrate 17, the upper transparent electrode 18, the upper alignment layer 19 for a liquid crystal, a liquid crystal layer 20, the lower alignment layer 21 for a liquid crystal, the lower transparent electrode 22, the lower substrate 23, and the lower polarization plate 24.

Referring to FIGS. 7A and 7B, the light modulator 02 may be composed of a liquid crystal panel and a light source 01 in the blue (about 440 nm) to ultraviolet (about 365 nm) region (365 nm) of wavelength. However, the light modulator and the light source are not limited to the foregoing statements, and the configuration of the light modulator may be appropriately adjusted according to the properties of the light source.

Referring to FIG. 7A, when the applied voltage is above the threshold for the reorientation of the liquid crystal which is initially vertically aligned (VA), called the VA mode, the QD pattern corresponding to the bright state in the light-modulated QD color display, QD patterns 06 to 08 emit light by the photo-excitation through the light modulator from the light source. In the VA mode, the rubbing direction on the vertical alignment layer for the liquid crystal may makes 45° with respect to one of the polarization plates (16 or 24).

Specifically, light from the light source 01 is linearly polarized after passing through the lower polarization plate 24 of the light modulator 02 and undergoes the phase retardation through the liquid crystal layer 20. In this instance, the thickness of the liquid crystal layer 20 is chosen to produce the phase retardation as much as a half (½) wavelength with respect to the central wavelength of the light source. Light passing through the liquid crystal layer 20 is then transmitted through the upper polarization plate 16 whose polarization is perpendicular to the polarization of the lower polarization plate 24, and it provides the photo-excitation of the corresponding QD patterns to emit light from the light-emitting element 03. Through this, light emission from QD is eventually modulated depending on the amount of the transmitted light through the modulator as a function the applied voltage.

Although in the above embodiment, a description is made on the basis of configuration in which the substrate 04 in the QD light emitting element 03 is positioned on the light modulator 02, according to another embodiment, the substrate 04 may be upside down to position on the topmost of the QD light emitting element 03. In other words, the QD pattern 06 to 08 in the QD light emitting element 03 may be in direct contact with the outer surface of the light modulator 02. Accordingly, the alignment layer 05 and the substrate 04 are positioned thereon in a sequential order. In this case, the substrate 04 serves as a protection plate for the QD patterns.

Further, in the present disclosure, the arrangement of the QD pattern, the alignment layer, and the substrate is not limited to a particular order, and a structure in which the transmitted light through the light modulator from the light source reaches the QD pattern and light emission from the QD pattern will suffice.

On the other hand, referring to FIG. 7B, when no voltage or the voltage less than the threshold is not applied to the light-modulated QD color display, the vertically aligned (VA) liquid crystal layer 20 does not produce the phase retardation under crossed polarization states of the upper polarization plate 16 and the lower polarization plate 24, and thus light through the lower polarization plate 24 from the light source 01 is not transmitted through the upper polarization plate 16 in the light modulator 02. However, the above-described normally black (NB) mode is for illustration only, and a method for controlling the brightness upon the application of the voltage is not limited. For example, in one case in which the polarization states of the upper and lower polarization plates are parallel to each other (the angle between them is zero) in the VA mode, the light-modulated QD color display may be in a normally white (NW) mode in which light is transmitted under no voltage and is not transmitted when the voltage is applied. In another case in which the liquid crystal in the light modulator is initially homogeneously aligned in the plane of the substrate, the same principle is applied.

By this principle of the light modulator, it is possible to achieve the intensity-tunable light emission from the QD pattern as a function of the voltage. Depending on the amount of the transmitted light intensity through the light modulator from the light source, the light emission from each of QD patterns for R. G, and B colors is controlled as described below.

Figure 8A:
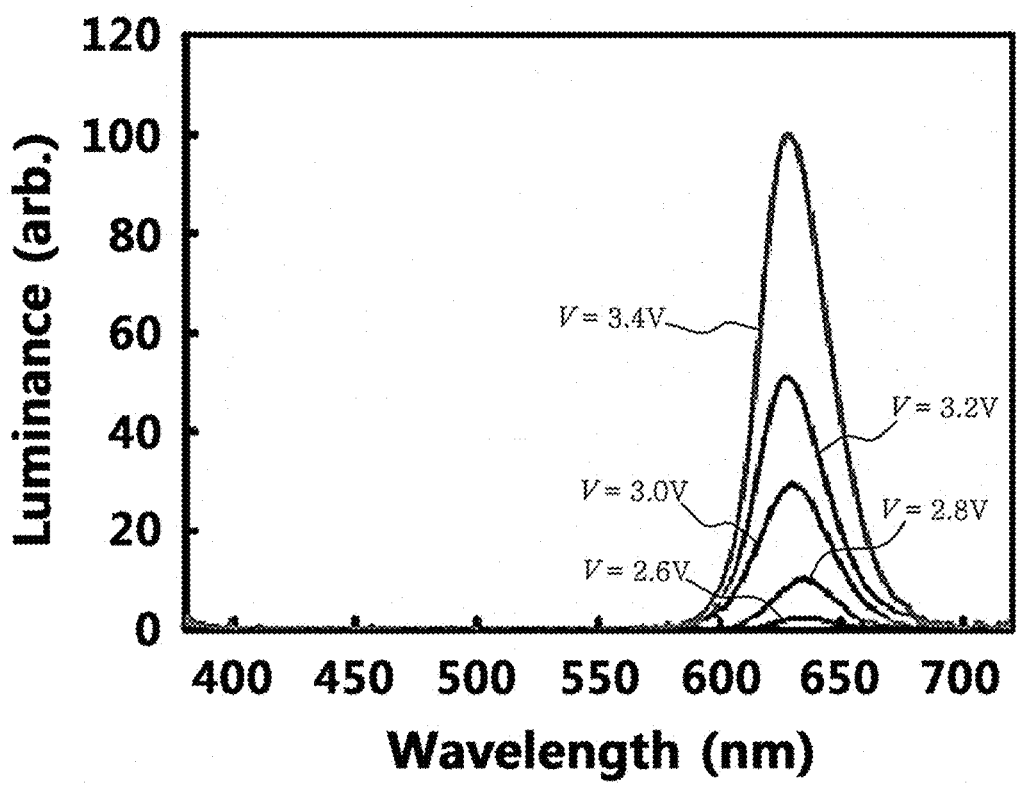
FIGS. 8A to 8C are the emission intensity curves (luminance) as a function of the wavelength at different values of the applied voltage for red (R), green (G), and blue (B) unit pixels of a light-modulated QD color display, respectively, according to an embodiment.
Figure 8B:
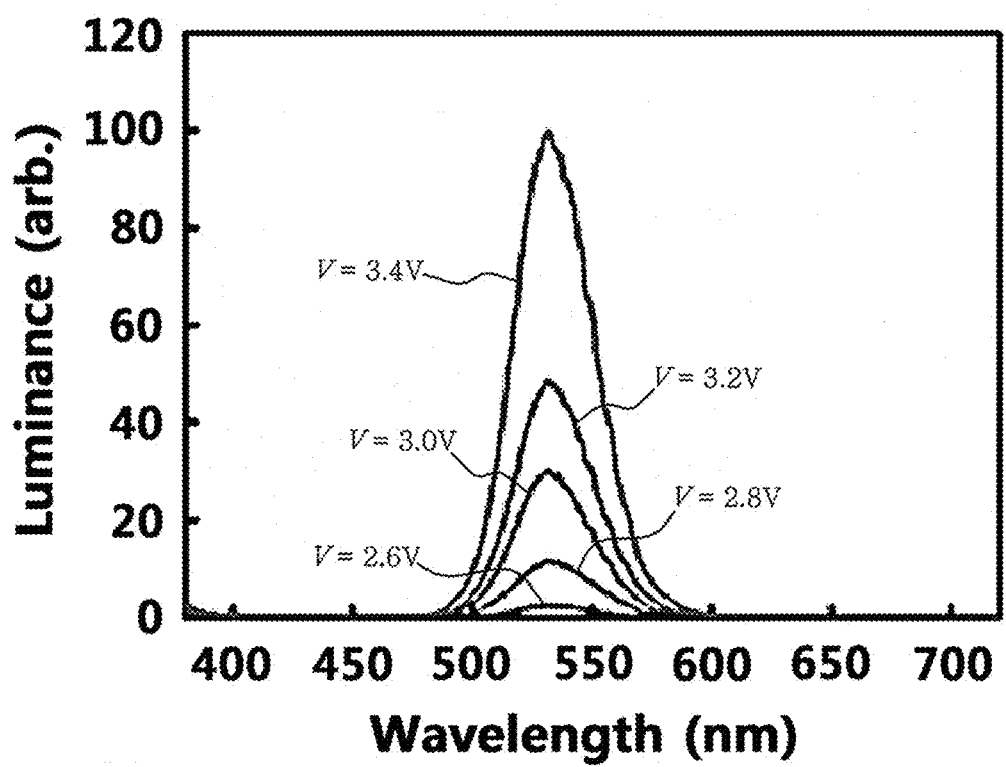
Figure 8C:
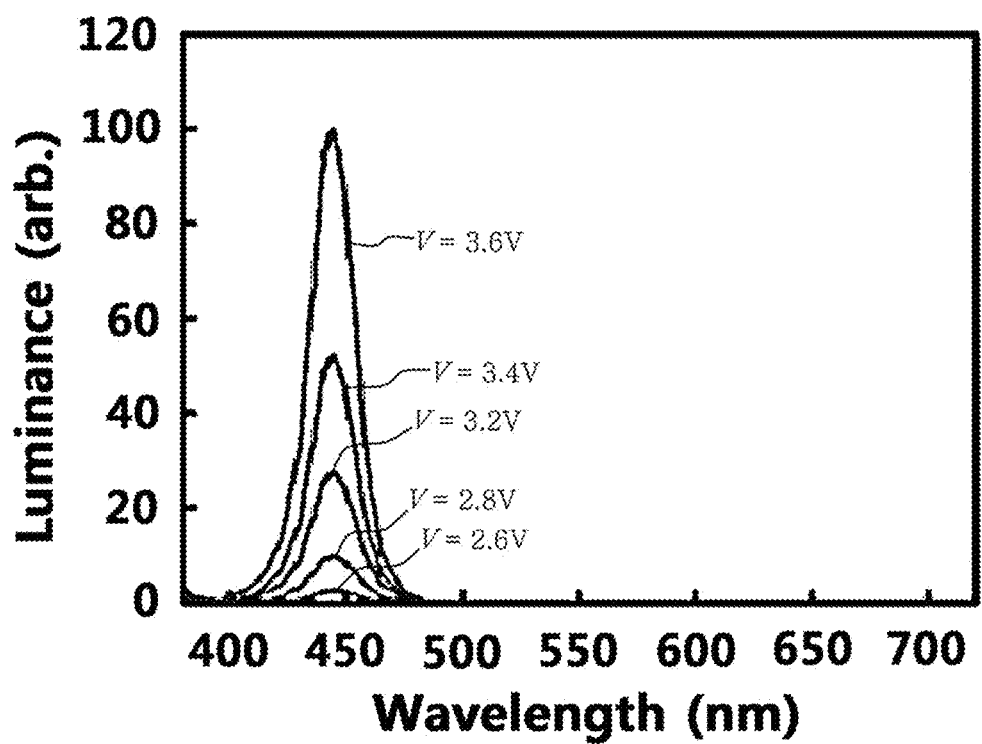

FIGS. 8A to 8C are the emission intensity curves (luminance) as a function of the wavelength at different values of the applied voltage for red (R), green (G), and blue (B) unit pixels of a light-modulated QD color display, respectively. They resemble the light emission properties at characteristic wavelengths in FIGS. 5A to 5C. The emission intensities are measured using a commercial UV-Vis. Fiber optic spectrometer (Ocean Optics S2000) in ambient environment. FIGS. 8A and 8B are the emission intensity curves of red (R) and green (G) unit pixels as a function of the wavelength at different values of the applied voltage (2.6, 2.8, 3.0, 3.2, 3.4 V). When the voltage above the threshold is applied, light from the light source is transmitted through the light modulator, causing the photo-excitation of QD, and light emission from QD is produced. As the applied voltage increases, the transmitted light intensity through the light modulator increases and the emission intensity from QD increases while maintaining the spectral range and shape. FIG. 8C shows the emission intensity curves of blue (B) unit pixel as a function of the wavelength at different values of the applied voltage (2.6, 2.8, 3.2, 3.4, 3.6 V). Similar to FIGS. 8A and 8B, the emission intensity increases with increasing the applied voltage while maintaining the range and the shape of the spectrum. The only difference between B and R (or G) cases is the relative emission intensity for given voltage, for example, above 3.0 V. This is attributed to less energy transfer and conversion for light emission of QD from ultraviolet to blue wavelength. Due to the intrinsic emission properties of QDs, in all three cases of R. G. and B, the ranges and the shapes of the emission spectra are well preserved and the emission intensities are tunable as a function of the voltage. This enables to achieve high color purity and wide color gamut in the light-modulated QD color display.

Figure 9A:
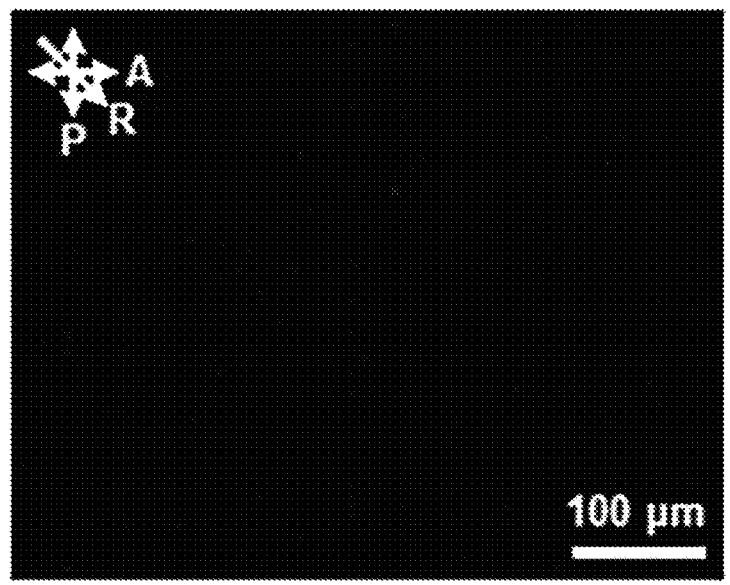
FIGS. 9A to 9E are photographs showing the operation of a light-modulated QD color display to express character images in different colors according to an embodiment.

FIGS. 9A to 9E are photographs showing the operation of a light-modulated QD color display to express character images in different colors according to an embodiment. Denoting the voltages applied to red (R), green (G) and blue (B) unit pixels as $V_R$, $V_G$, and $V_B$, respectively, when $V_R$=0, $V_G$=0, $V_B$=0, no light emission from the QD patterns of R, G, and B are observed as shown in FIG. 9A because light from the light source is blocked by the upper polarization plate in the light modulator, not producing the light emission from QD by photo-excitation.

Figure 9B:
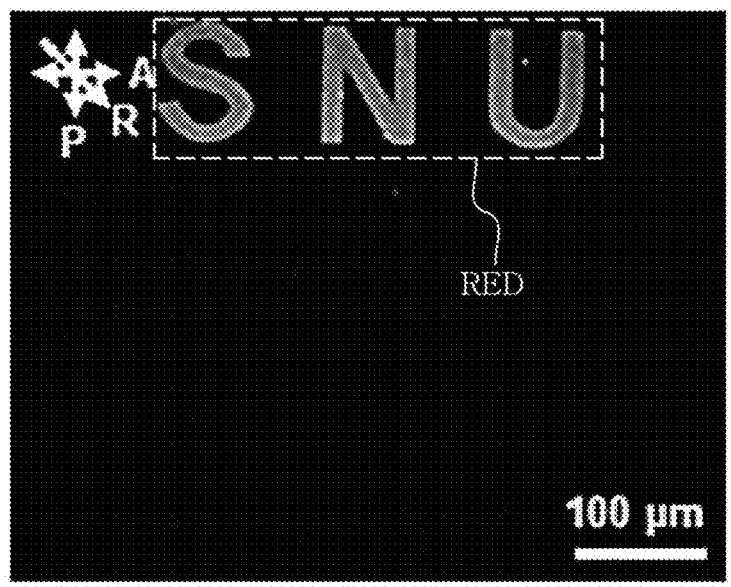
Figure 9C:
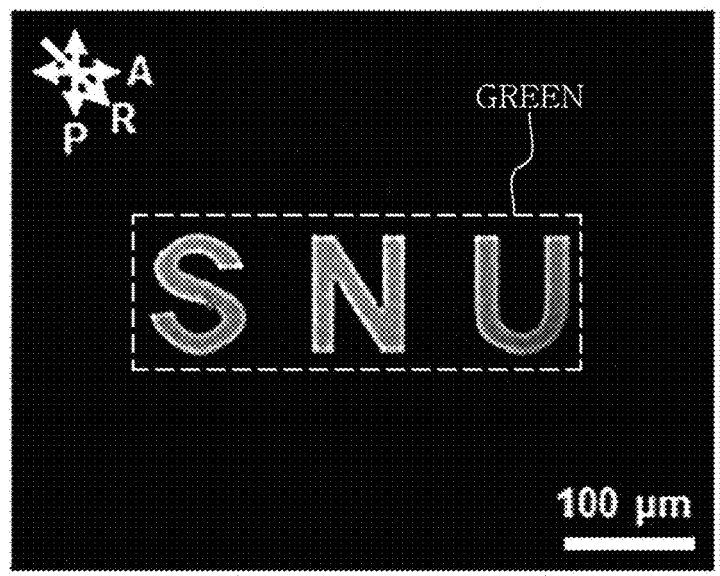
Figure 9D:
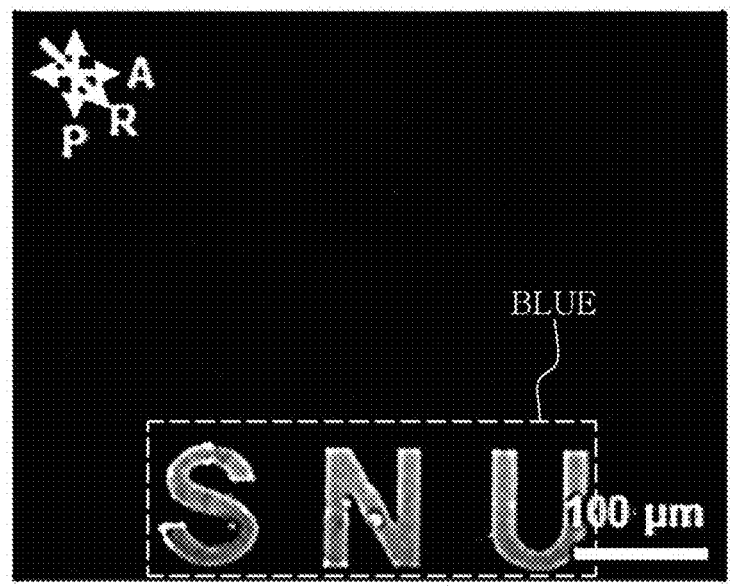

On the other hand, FIGS. 9B to 9D show the light emission from the QD patterns of R ($V_R$=3.4, $V_G$=0, and $V_B$=0 V), ($V_R$=0, $V_G$=3.4, and $V_B$=0 V), and B ($V_R$=0, $V_G$=0, $V_B$=3.4 V) at the voltage above the threshold, respectively. The rubbing direction (R) on the vertical alignment layer for the liquid crystal makes 45 with respect to the polarizations states (A and P) of the upper and lower polarization plates (16 and 24).

Figure 9E:
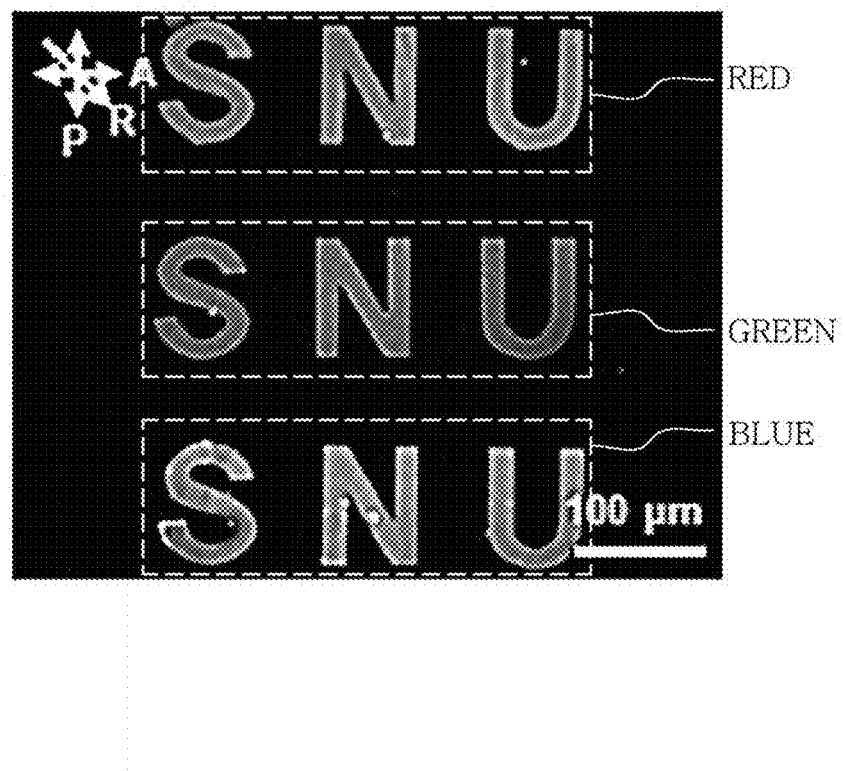

FIG. 9E is the photograph showing the light emission from all three types of the QD patterns of R, G, and B colors at the same voltages of $V_R$=$V_G$=$V_B$=3.4 V, expressing the character image of 'SNU'. Each of R, G, and B unit pixels can work independently.

According to the embodiments described hereinabove, there is provided a light-modulated QD color display with high color uniformity and high color purity through the implementation of aligned matrix QD patterns, and the limitation on coloration elements is relaxed and superior applicability is provided. However, the configuration of the light-modulated QD color display as described above is for illustration only, and the wavelength range of the light source used for photo-excitation of QD and the configuration and structure of the light modulator that controls the transmittance of the light source through it is not limited to the material used in the embodiments, and may include any other material and structure capable of controlling the transmitted intensity from the light source for the QD excitation.

The QD color display according to the embodiments as described above has the uniform distribution of QDs in the aligned matrix, and further, allows QDs to emit light and to produce tunable intensity by means of the light modulator, dissimilar to the related art simply using a QD film as a part of the backlight unit in a liquid crystal display (LCD) structure, thereby providing a light-emitting color display achieving high color purity without using a color filter beyond the limitations of existing color display technology.

Additionally, in contrast to traditional light-emitting technology, requiring complex processes such as electron or hole injection, transport, recombination and light emission, it is possible to directly emit light from QDs by the photo-excitation, providing economic efficiency and a commercially superior effect in that it can be easily applied and manufactured by existing liquid crystal display (LCD) manufacturers.

While the present disclosure has been hereinabove described with reference to the embodiments shown in the drawings, this is provided for illustration only and those skilled in the art will understand that various modifications and variations may be made to the embodiments. However, it should be noted that such modifications fall in the technical protection scope of the present disclosure. Therefore, the true technical protection scope of the present disclosure should be defined by the technical spirit of the appended claims.

What is claimed is:

1. A light-modulated quantum dot (QD) color display, comprising:
   a light source;
   a light modulator positioned above the light source to control transmittance of light generated from the light source; and
   a QD light-emitting element positioned above the light modulator to emit light by the transmitted light, wherein the QD light-emitting element further includes:
   a substrate;
   an alignment layer on the substrate; and
   a plurality of matrix QD patterns on the alignment layer that is disposed between the substrate and the plurality of matrix QD patterns, each of the plurality of matrix QD patterns including a plurality of QDs and a matrix of a plurality of aligned polymers that are aligned along a same alignment direction due to the alignment layer, wherein the matrix of the plurality of aligned polymers uniformly distributes the plurality of QDs within the matrix QD pattern.

2. The light-modulated QD color display according to claim 1, wherein the plurality of matrix QD patterns has different emission properties.

3. The light-modulated QD color display according to claim 1, wherein at least two of the plurality of matrix QD patterns have different values of the thickness of the QD patterns or different sizes and materials of QDs therein.

4. The light-modulated QD color display according to claim 1, wherein the alignment direction of the plurality of aligned polymers is set to a direction that is between vertical and horizontal to the plane of the substrate.

5. The light-modulated QD color display according to claim 1, wherein the matrix of the plurality of aligned polymers is made of reactive mesogen or photoalignment material.

6. The light-modulated QD color display according to claim 1, wherein each of the plurality of QD patterns has a cross section of a closed shape in geometry, forming a polygon or a curve and a straight line when viewed along a direction perpendicular to the plane of the substrate.

7. The light-modulated QD color display according to claim 1, wherein the light source has a wavelength range that is used for the photo-excitation of QDs to emit light.

8. The light-modulated QD color display according to claim 1, wherein the light modulator controls transmittance of light generated from the light source for each pixel.

9. The light-modulated QD color display according to claim 1, wherein the light modulator is made of a liquid crystal.

10. A method for manufacturing a light-modulated quantum dot (QD) color display, comprising:
    forming an alignment layer on an outer surface or an inner surface of a substrate;
    forming a plurality of matrix QD patterns having different emission properties on the alignment layer, each of the plurality of matrix QD patterns including a plurality of QDs and a matrix of a plurality of aligned polymers that are aligned along a same alignment direction due to the alignment layer, wherein the matrix of the plurality of aligned polymers uniformly distributes the plurality of QDs within the matrix QD pattern;
    placing the substrate with the plurality of matrix QD patterns above a light modulator; and
    placing the light modulator with the substrate above a light source.

11. The method for manufacturing the light-modulated QD color display according to claim 10, wherein at least two of the plurality of matrix QD patterns have different values of the thickness of the QD patterns or different sizes and materials of QDs.

12. The method for manufacturing the light-modulated QD color display according to claim 10, wherein the alignment direction of the matrix of the plurality of aligned polymers is set to a direction that is between vertical and horizontal to the plane of the substrate.

13. The method for manufacturing the light-modulated QD color display according to claim 10, wherein the matrix of the plurality of aligned polymers is reactive mesogen or photoalignment material.

14. The method for manufacturing the light-modulated QD color display according to claim 10, wherein each of the plurality of matrix QD patterns has a cross section of a closed a closed shape in geometry, forming a polygon or a curve and a straight line when viewed along a direction perpendicular to the plane of the substrate.

15. A quantum dot (QD) light emitting panel, comprising:
    a plurality of matrix QD patterns having different emission properties, each of the plurality of matrix QD patterns including a plurality of QDs and a matrix of a plurality of aligned polymers that are aligned along a same alignment direction,
    wherein the matrix of the plurality of aligned polymers uniformly distributes the plurality of QDs within the matrix QD such that the plurality of matrix QD patterns has uniform light emission.

16. The QD light emitting panel according to claim 15, wherein the matrix of the plurality of aligned polymers is made of reactive mesogen or photoalignment material.

17. The QD light emitting panel according to claim 15, wherein at least two of the plurality of QD patterns have different values of the thickness of the QD patterns or different sizes and materials of QDs therein.

18. The QD light emitting panel according to claim 15, wherein the light emission from the plurality of QD patterns is electro-luminescence upon the application of an external voltage, or photo-luminescence upon photo-energy transfer from a light source.

* * * * *